(12) United States Patent
Suzuki et al.

(10) Patent No.: US 8,104,805 B2
(45) Date of Patent: Jan. 31, 2012

(54) SHOCK ABSORBING MEMBER

(75) Inventors: Hiroaki Suzuki, Aichi (JP); Yasuhiro Toyoguchi, Anjo (JP); Soshi Mitsuyama, Toyota (JP)

(73) Assignees: INOAC Corporation, Nagoya-Shi (JP); Toyota Jidosha Kabushiki Kaisha, Toyota-Shi (JP)

( * ) Notice: Subject to any disclaimer, the term of this patent is extended or adjusted under 35 U.S.C. 154(b) by 109 days.

(21) Appl. No.: 12/520,102

(22) PCT Filed: Apr. 24, 2008

(86) PCT No.: PCT/JP2008/057978
§ 371 (c)(1),
(2), (4) Date: Jun. 19, 2009

(87) PCT Pub. No.: WO2008/133308
PCT Pub. Date: Nov. 6, 2008

(65) Prior Publication Data
US 2010/0013250 A1    Jan. 21, 2010

(30) Foreign Application Priority Data
Apr. 25, 2007  (JP) .................................. 2007-115086

(51) Int. Cl.
*B60R 19/26* (2006.01)
(52) U.S. Cl. ......................................................... 293/132
(58) Field of Classification Search .................. 293/132, 293/120, 102, 133; 296/187.03
See application file for complete search history.

(56) References Cited

U.S. PATENT DOCUMENTS
4,397,490 A * 8/1983 Evans et al. .................... 293/120
4,424,996 A * 1/1984 Yoshiyuki ...................... 293/117
(Continued)

FOREIGN PATENT DOCUMENTS
EP          1199224 A1     4/2002
(Continued)

OTHER PUBLICATIONS
Extended European Search Report issued May 11, 2011, in Application No. 08752067.2.

*Primary Examiner* — Kiran B. Patel
(74) *Attorney, Agent, or Firm* — Sughrue Mion, PLLC

(57) ABSTRACT

An object of the invention is to provide a shock absorbing member enabled to reduce stress applied at the moment of impact to each part serving as an attaching portion. The shock absorbing member 10A includes a pressure receiving wall portion 11A to be pressed at the moment of impact, a side wall portion 21A formed on one end portion side in a direction H perpendicular to a longitudinal direction L of the pressure receiving wall portion 11A to extend along the longitudinal direction L towards a rear of the pressure receiving wall portion 11A, a plurality of vertical ribs 31A that are formed on the other end portion side of the pressure receiving wall portion 11A opposite to the one end portion side, on which the side wall portion 21A is formed, that are provided towards the rear of said pressure receiving wall portion 11A to intersect with the longitudinal direction L, that are arranged like rows to the longitudinal direction L, and flange portions 41A and 51A respectively formed on one end portion side of the side wall portion 21A, which is opposite to the pressure receiving wall portion 11A, and on one end portion side of each of the vertical ribs 31A, which is opposite to the pressure receiving wall portion 11A.

6 Claims, 11 Drawing Sheets

U.S. PATENT DOCUMENTS

| | | | |
|---|---|---|---|
| 4,533,166 A * | 8/1985 | Stokes | 293/120 |
| 4,573,724 A * | 3/1986 | Campen | 293/136 |
| 4,673,205 A * | 6/1987 | Drewek | 293/132 |
| 5,150,935 A * | 9/1992 | Glance et al. | 293/136 |
| 5,201,912 A * | 4/1993 | Terada et al. | 293/120 |
| 5,269,574 A * | 12/1993 | Bhutani et al. | 293/102 |
| 5,301,990 A * | 4/1994 | Willeford | 293/107 |
| 6,082,792 A * | 7/2000 | Evans et al. | 293/133 |
| 6,398,275 B1 * | 6/2002 | Hartel et al. | 293/102 |
| 6,406,079 B2 * | 6/2002 | Tamada et al. | 293/120 |
| 6,443,511 B2 * | 9/2002 | Braun | 293/120 |
| 6,547,295 B2 * | 4/2003 | Vismara | 293/133 |
| 6,663,150 B1 * | 12/2003 | Evans | 293/120 |
| 6,666,488 B2 * | 12/2003 | Rinklin | 293/120 |
| 6,669,252 B2 * | 12/2003 | Roussel et al. | 293/120 |
| 6,672,635 B2 * | 1/2004 | Weissenborn et al. | 293/120 |
| 6,848,730 B2 * | 2/2005 | Evans | 293/121 |
| 6,851,731 B2 * | 2/2005 | Janssen | 293/102 |
| 6,874,831 B1 * | 4/2005 | Pouget et al. | 293/115 |
| 6,874,832 B2 * | 4/2005 | Evans et al. | 293/120 |
| 6,893,064 B2 * | 5/2005 | Satou | 293/132 |
| 6,923,494 B2 * | 8/2005 | Shuler et al. | 296/187.05 |
| 6,938,936 B2 * | 9/2005 | Mooijman et al. | 293/120 |
| 6,971,690 B2 * | 12/2005 | Evans et al. | 293/102 |
| 6,991,282 B2 * | 1/2006 | Suzuki et al. | 296/187.03 |
| 6,994,384 B2 * | 2/2006 | Shuler et al. | 293/120 |
| 7,004,519 B2 * | 2/2006 | Roussel et al. | 293/120 |
| 7,044,515 B2 * | 5/2006 | Mooijman et al. | 293/120 |
| 7,052,056 B2 * | 5/2006 | Weissenborn et al. | 293/120 |
| 7,086,690 B2 * | 8/2006 | Shuler et al. | 296/187.03 |
| 7,090,288 B2 * | 8/2006 | Suzuki et al. | 296/187.09 |
| 7,093,866 B2 * | 8/2006 | Toneatti et al. | 293/133 |
| 7,131,674 B2 * | 11/2006 | Evans et al. | 293/120 |
| 7,159,911 B2 * | 1/2007 | Nguyen et al. | 293/102 |
| 7,163,243 B2 * | 1/2007 | Evans | 293/121 |
| 7,172,227 B2 * | 2/2007 | Weissenborn et al. | 293/121 |
| 7,234,741 B1 * | 6/2007 | Reynolds et al. | 293/117 |
| 7,278,667 B2 * | 10/2007 | Mohapatra et al. | 293/132 |
| 7,340,833 B2 * | 3/2008 | Weissenborn et al. | 29/897.2 |
| 7,407,219 B2 * | 8/2008 | Glasgow et al. | 296/187.03 |
| 7,469,956 B2 * | 12/2008 | Yasuhara et al. | 296/187.09 |
| 7,488,016 B2 * | 2/2009 | Nakamae et al. | 293/117 |
| 7,494,165 B2 * | 2/2009 | Evans et al. | 293/102 |
| 7,568,746 B2 * | 8/2009 | Jaarda et al. | 293/132 |
| 7,611,177 B1 * | 11/2009 | Schelberg et al. | 293/132 |
| 7,618,082 B2 * | 11/2009 | Tamada | 296/146.6 |
| 7,637,545 B2 * | 12/2009 | Takahashi et al. | 293/132 |
| 7,677,615 B2 * | 3/2010 | Emura | 293/102 |
| 7,677,616 B2 * | 3/2010 | Taniguchi et al. | 293/133 |
| 7,677,617 B2 * | 3/2010 | Stewart et al. | 293/133 |
| 7,699,367 B2 * | 4/2010 | Evans et al. | 293/120 |
| 7,726,709 B2 * | 6/2010 | Sampaio | 293/122 |
| 7,806,448 B2 * | 10/2010 | Allen et al. | 293/120 |
| 7,891,715 B2 * | 2/2011 | Noyori et al. | 293/121 |
| 2003/0080573 A1 * | 5/2003 | Marijnissen et al. | 293/132 |
| 2004/0094975 A1 | 5/2004 | Shuler et al. | |
| 2005/0089674 A1 * | 4/2005 | Zander et al. | 428/158 |
| 2005/0264037 A1 * | 12/2005 | Urushiyama et al. | 296/187.03 |
| 2007/0210615 A1 | 9/2007 | Tamada | |
| 2009/0058112 A1 * | 3/2009 | Schwarz et al. | 293/132 |
| 2009/0160203 A1 * | 6/2009 | Garg et al. | 293/120 |
| 2009/0250953 A1 * | 10/2009 | Perucca et al. | 293/132 |

FOREIGN PATENT DOCUMENTS

| | | |
|---|---|---|
| FR | 2860197 A1 | 4/2005 |
| JP | 2-105053 U | 8/1990 |
| JP | 3-224851 A | 10/1991 |
| JP | 2005-510393 A | 4/2005 |
| JP | 2005-125962 A | 5/2005 |
| JP | 2005-161882 A | 6/2005 |

* cited by examiner

SHOCK ABSORBING MEMBER

TECHNICAL FIELD

The present disclosure relates to a shock absorbing member suitable as a component member of a bumper or the like of an automobile.

BACKGROUND ART

There has been a synthetic resin shock absorbing member 70 including a pressure receiving wall portion 71 and side wall portions 73, 73, as illustrated in FIG. 11. The synthetic resin shock absorbing member 70 is used as the shock absorbing member of a bumper of an automobile and is formed by being transverse-cross-sectionally substantially U-shaped. Each of the side wall portions 73, 73 of the synthetic resin shock absorbing member 70 is formed to extend from an associated one of both end portions 72, 72 of the pressure receiving wall portion 71 placed in a direction (i.e., an up-down direction of a vehicle) H1 intersecting with a longitudinal direction (i.e., a direction perpendicular to the drawing in the case of an example illustrated therein) towards the rear of the pressure receiving wall portion 71 along the longitudinal direction. Each of flange portions 75, 75 serving as an attaching portion is formed at an associated one of end portions 75, 75 opposite to the pressure receiving wall portion 71. The flange portions 75, 75 are fixed to the front surface of a bumper reinforcement (referred to also as a bumper beam) 81 with attachment members 85, such as bolts or the like. Thus, the shock absorbing member 70 is attached to the bumper reinforcement 81. Incidentally, the shock absorbing member 70 is covered with a synthetic resin bumper facer 87 to thereby improve the appearance of the bumper.
[Patent Document 1] JP-T-2005-510393

DISCLOSURE OF THE INVENTION

The shock absorbing member 70 is such that when the pressure receiving wall portion 71 is pressed by a collision with a vehicle or the like, the side wall portions 73, 73 are deformed in an up-down direction of the vehicle, which intersects with the longitudinal direction of the pressure receiving wall portion 71, as shown in FIG. 12. Thus, the shock absorbing member 70 cushions shock by the deformation of the side wall portions 73, 73.

In the shock absorbing member 70, when the pressure receiving wall portion 71 is pressed, each of the side wall portions 73, 73 is deformed in the up-down direction of the vehicle. Thus, stress acting in the up-down direction is applied to the flange portions 75, 75 of the side wall portions 73, 73. The side wall portions 73, 73 are the same each other in the direction of deformation thereof. Consequently, stress generated due to the deformation of one of the side wall portions is propagated to the other side wall portion via the pressure receiving wall portion 71. A load imposed on each of the flange portions 75, 75 is further increased, so that the shock absorbing member 70 becomes easily breakable at the flange portions 75, 75.

It is considered for preventing the shock absorbing member 70 from being damaged at the flange portions 75, 75 that the thickness of the vicinity of the flange portion 75 in each of the side wall portions 73, 73 is set to be large. However, in the case of setting the thickness of the vicinity of the flange portion 75 to be large, the deformation of the side wall portions 73, 73 is impaired at the moment of impact. Thus, the shock absorbing ability of the shock absorbing member 70 is degraded. Therefore, this method is not suitable for the shock absorbing member 70.

It is also proposed that the side wall portions 73, 73 are preliminarily concavoconvexly bent shape. However, even in this case, up-down stress is applied to the flange portions 75, 75 at the moment of impact. Thus, the load on each of the flange portions 75, 75 is increased.

The present invention is accomplished in view of the aforementioned respects. The present invention provides a shock absorbing member enabled to reduce stress applied at the moment of impact to each part serving as an attaching portion.

According to a first aspect of the invention, there is provided a shock absorbing member that comprises a pressure receiving wall portion, a side wall portion formed on one end portion side in a direction perpendicular to a longitudinal direction of the pressure receiving wall portion to extend along the longitudinal direction towards a rear of the pressure receiving wall portion so that a flange portion is formed on one end portion side of the side wall portion, which is opposite to the pressure receiving portion, and a plurality of vertical ribs that are formed on the other end portion side of the pressure receiving wall portion opposite to the one end portion side on which the side wall portion is formed, that are provided towards the rear of the pressure receiving wall portion to intersect with the longitudinal direction, and that are arranged like rows to the longitudinal direction so that a flange portion is formed on one end portion side of each of the plurality of vertical ribs, which is opposite to the pressure receiving wall portion. In the first mode, preferably, the flange portion is formed substantially in parallel to the pressure receiving portion to connect end portions of the plurality of vertical ribs, which are opposite to the pressure receiving wall portion.

According to a second aspect of the invention, the member according to the first mode of the invention is featured in that a groove is formed in a surface of each of the plurality of vertical ribs such that the surface intersects with the longitudinal direction.

According to a third aspect of the invention, the member according to the first or second mode of the invention is featured in that a thickness of the side wall portion is reduced towards one end portion side thereof corresponding to the flange portion from the other end portion side thereof corresponding to the pressure receiving wall portion.

According to the first aspect of the invention, when the pressure receiving wall portion is pressed by the impact, the side wall portion formed on one end portion side of the pressure receiving wall portion is deformed in a direction intersecting with the side wall portion, i.e., a direction intersecting with the longitudinal direction of the pressure receiving wall portion. Thus, stress acting in a direction intersecting with the longitudinal direction of the pressure receiving wall portion is applied to the flange portion provided on one end portion side of the side wall portion. On the other hand, the vertical ribs formed on the opposite side of the pressure receiving wall portion are deformed in a direction intersecting with the vertical ribs, i.e., the longitudinal direction of the pressure receiving wall portion. In addition, stress acting along the longitudinal direction of the pressure receiving wall portion is applied to the flange portion corresponding to the end portion side of each of the vertical ribs. Thus, the shock absorbing member according to the invention is such that when the pressure receiving wall portion is pressed by the impact, stress acting in each of directions intersecting with each other is generated. Consequently, the stress generated at the application of impact thereto can be dispersed. In addition, the stress applied to each of both the flange portions can be reduced.

According to the second aspect of the invention, the bending groove is formed in the surface of each of the vertical ribs, which intersects with the longitudinal direction. Thus, the bending of the vertical ribs at the application of impact thereto is facilitated. Consequently, the vertical ribs can surely be bent in the longitudinal direction of the pressure receiving wall portion.

According to the third aspect of the invention, the thickness of the side wall portion is reduced towards one end portion side thereof corresponding to the flange portion from the other end portion side thereof corresponding to the pressure receiving wall portion. Thus, the flange portions serving as attaching portions can be prevented from being broken. In addition, the buckling distortion of the shock absorbing member under a constant load can be facilitated. Consequently, a shock load can be reduced to a low level.

Figure 1:
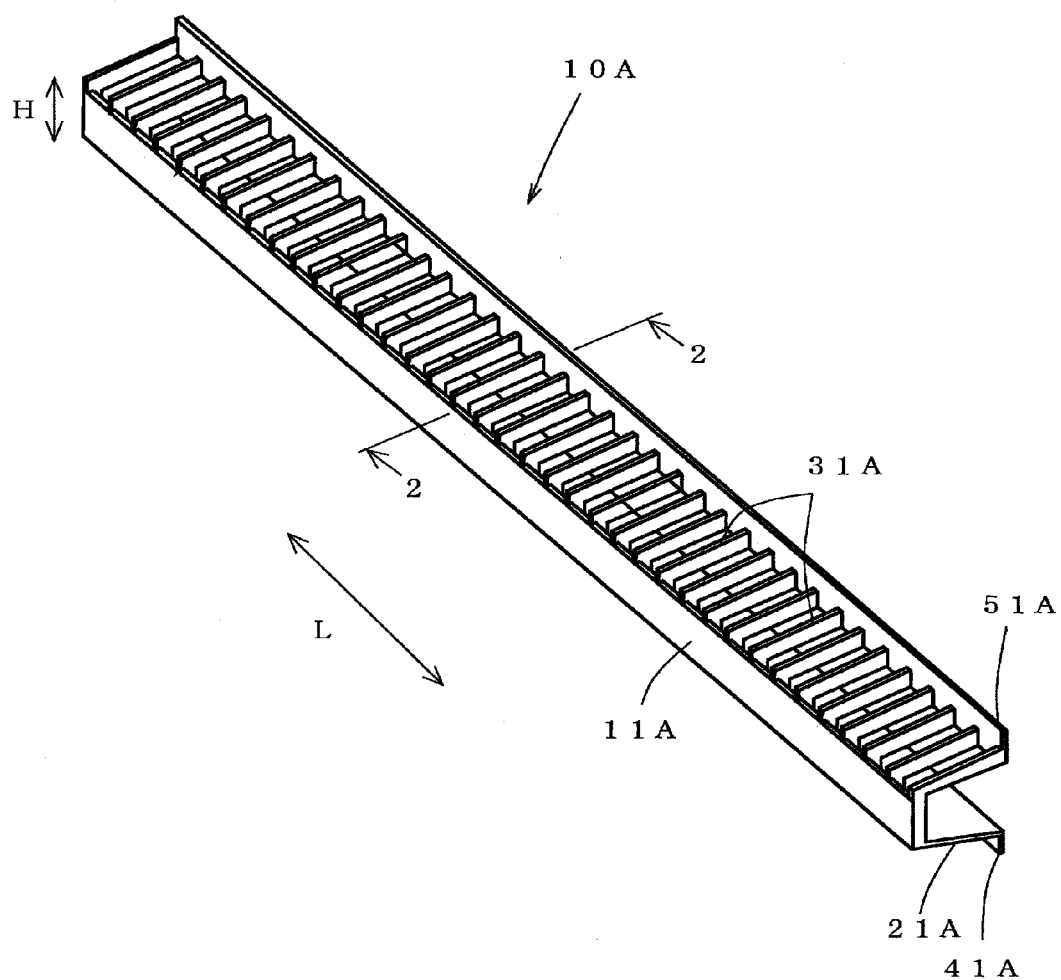
FIG. 1 is a perspective view illustrating a shock absorbing member according to a first embodiment of the invention.

DESCRIPTION OF REFERENCE NUMERALS AND SIGNS 10A, 10B, 10C shock absorbing members
11A, 11B, 11C pressure receiving wall portions
21A, 21B, 21C side wall portions
31A, 31B, 31C vertical ribs
41A, 41B, 41C, 51A, 51B, 51C flange portions

BEST MODE FOR CARRYING OUT THE INVENTION

Figure 2:
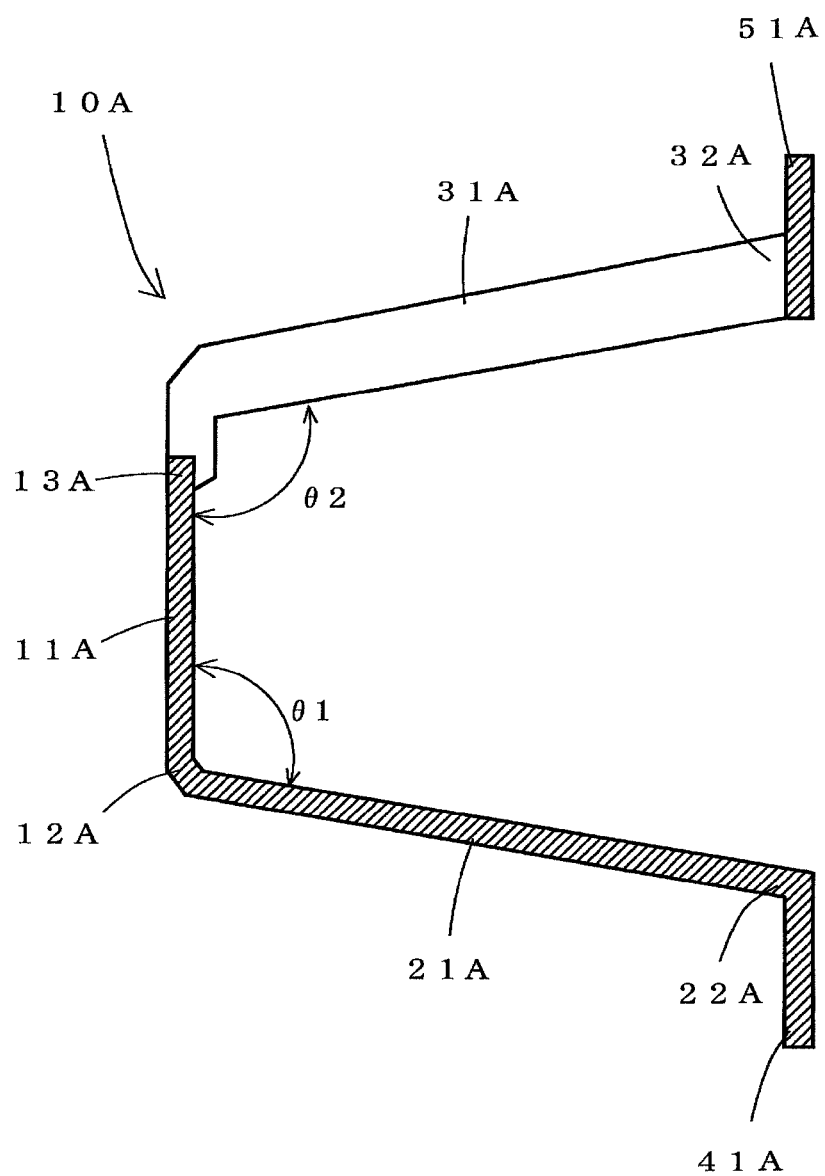
FIG. 2 is a cross-sectional view taken on line 2-2 illustrated in FIG. 1.
Figure 3:
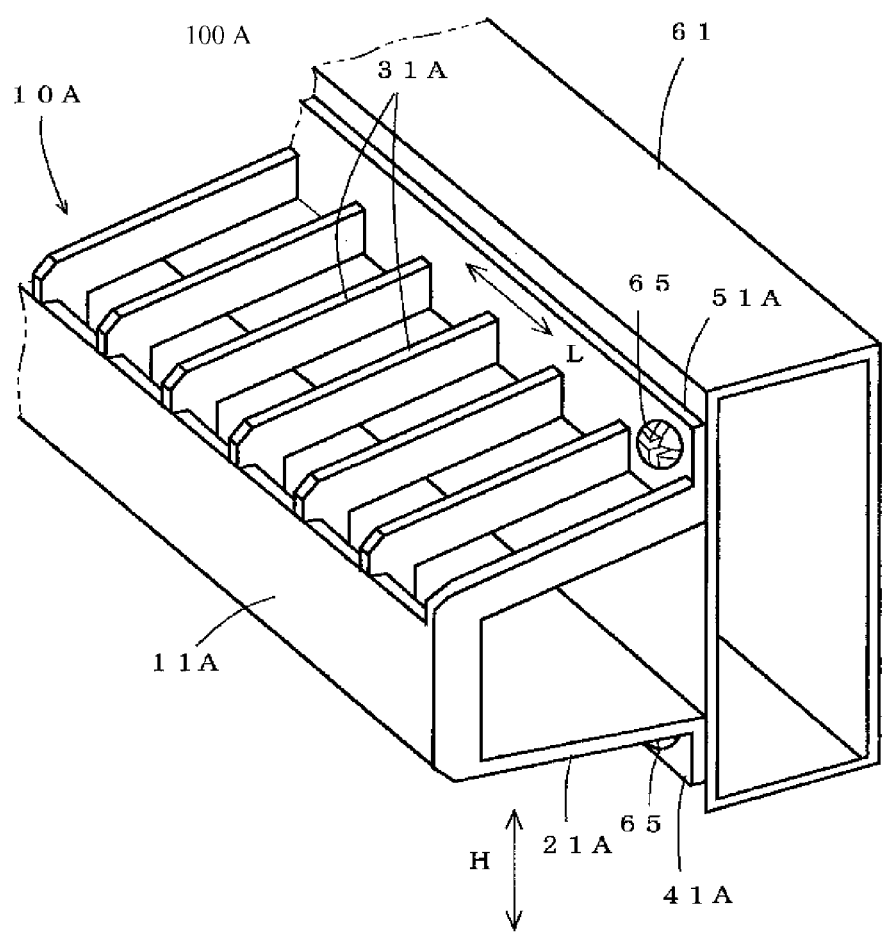
FIG. 3 is a perspective view illustrating an attached state of the shock absorbing member according to the first embodiment.
Figure 4:
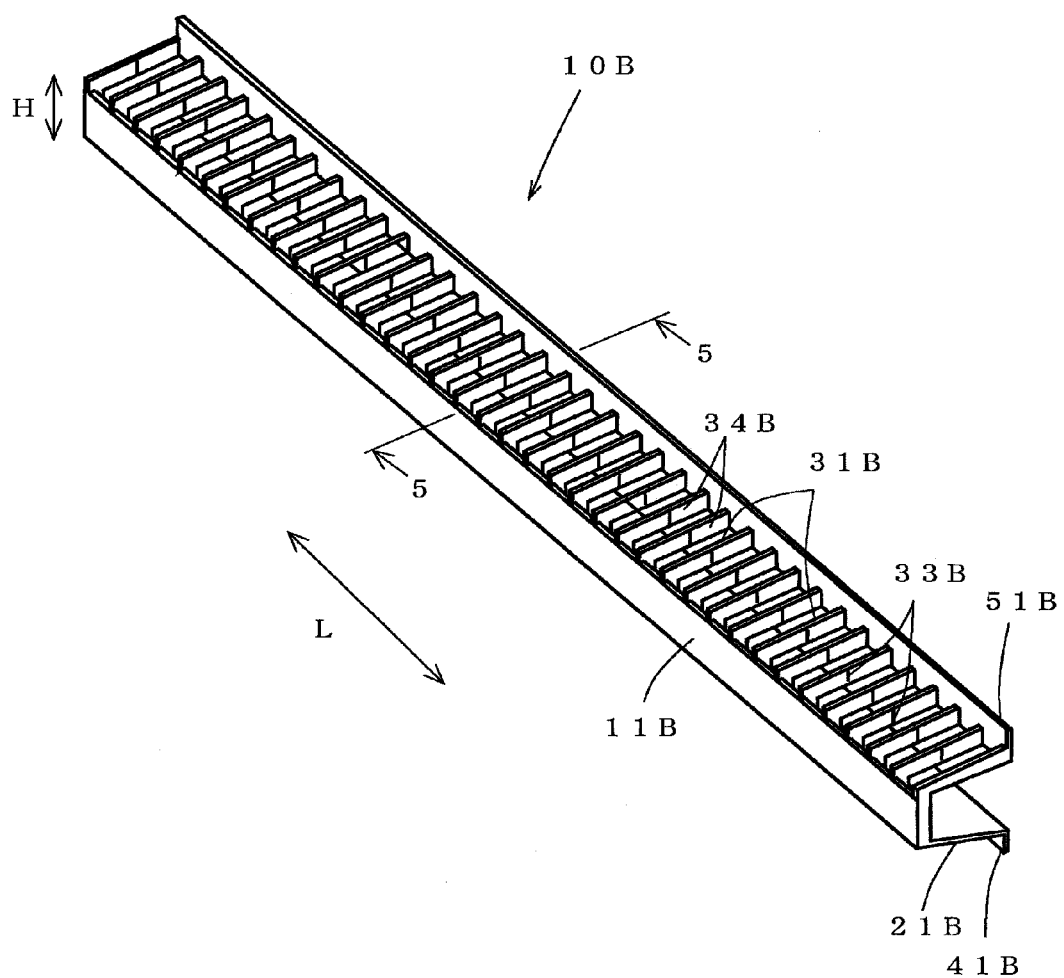
FIG. 4 is a perspective view illustrating a shock absorbing member according to a second embodiment of the invention.
Figure 5:
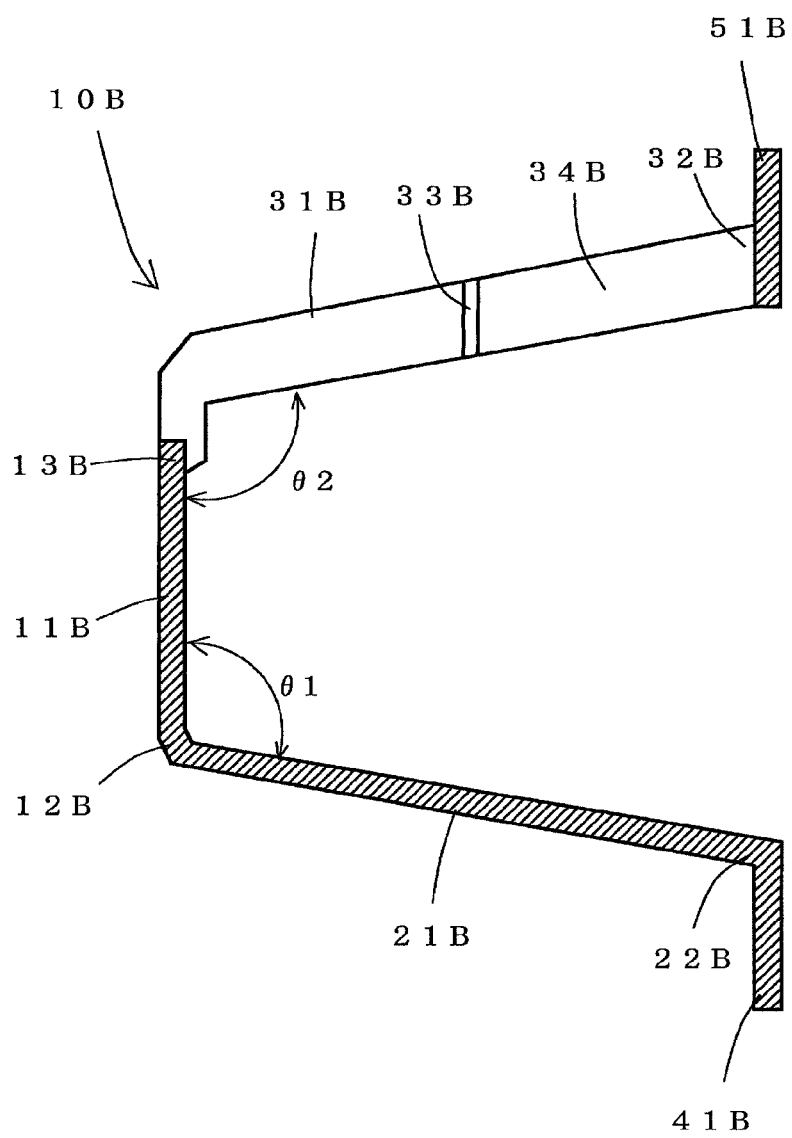
FIG. 5 is a cross-sectional view taken on line 5-5 illustrated in FIG. 4.
Figure 6:
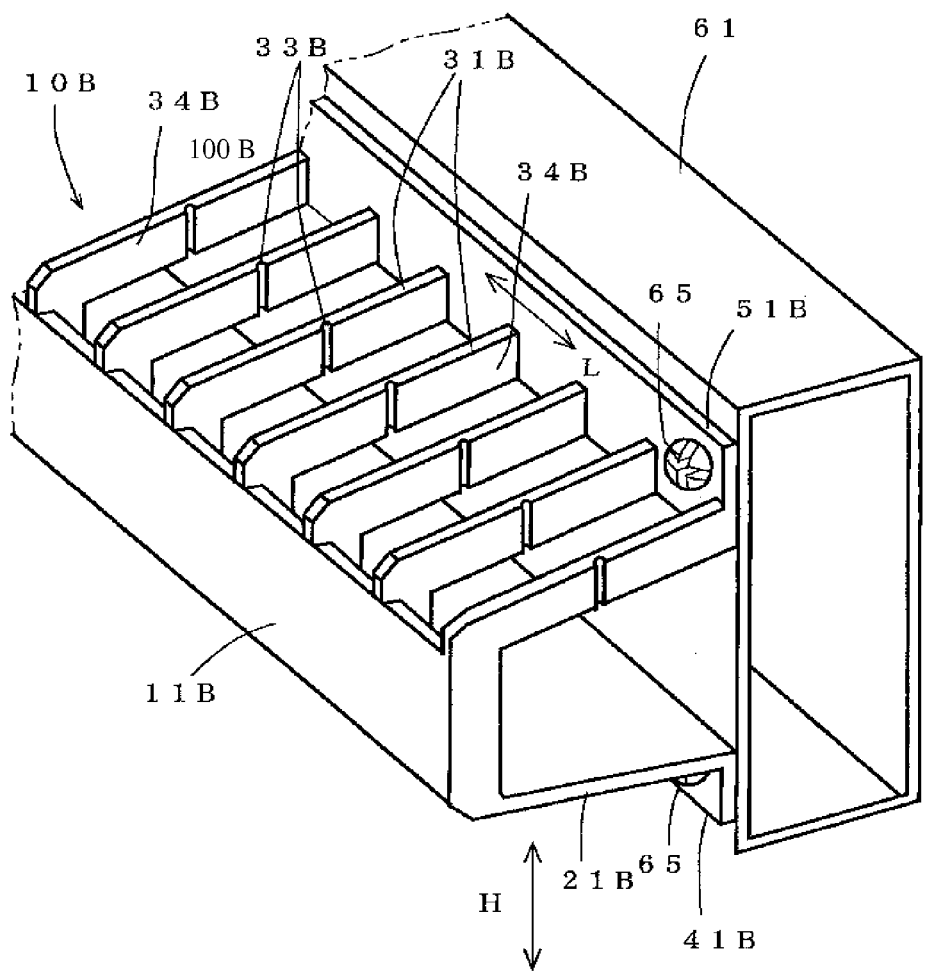
FIG. 6 is a perspective view illustrating an attached state of the shock absorbing member according to the second embodiment.
Figure 7:
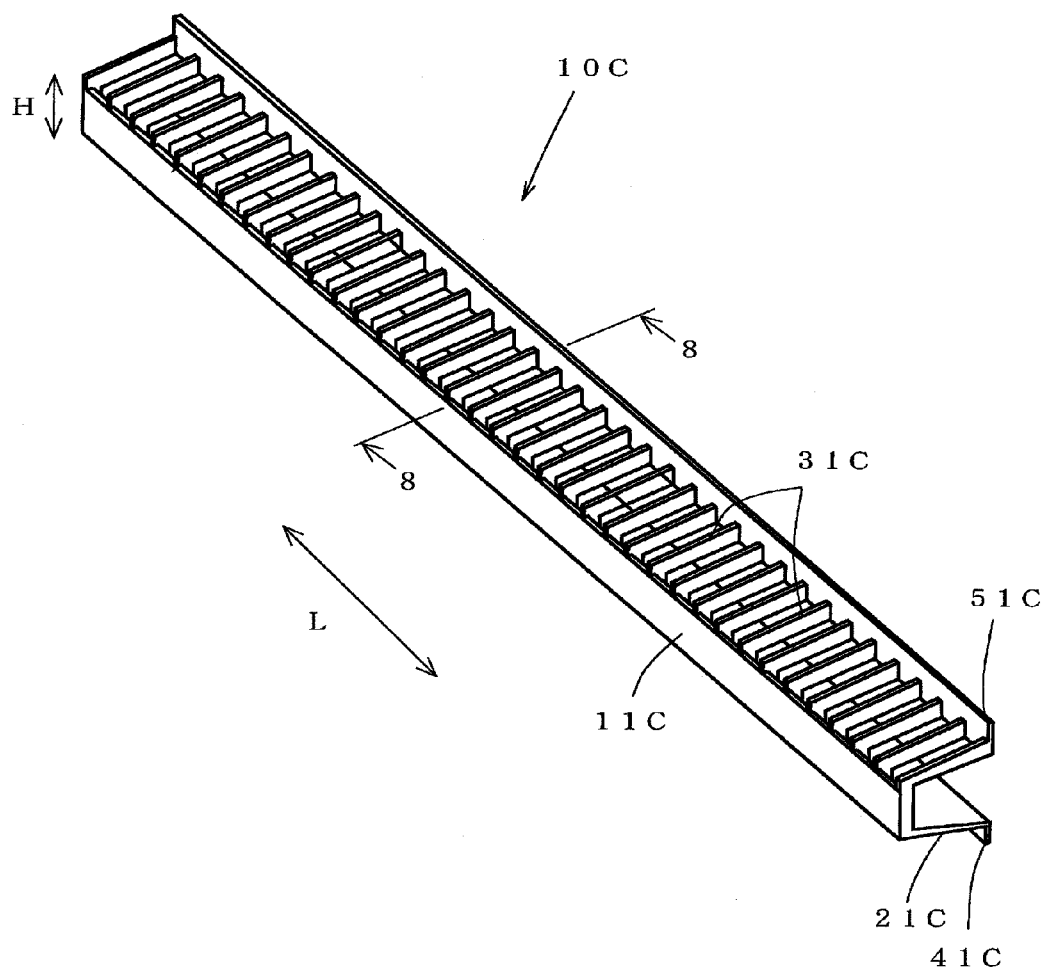
FIG. 7 is a perspective view illustrating a shock absorbing member according to a third embodiment of the invention.
Figure 8:
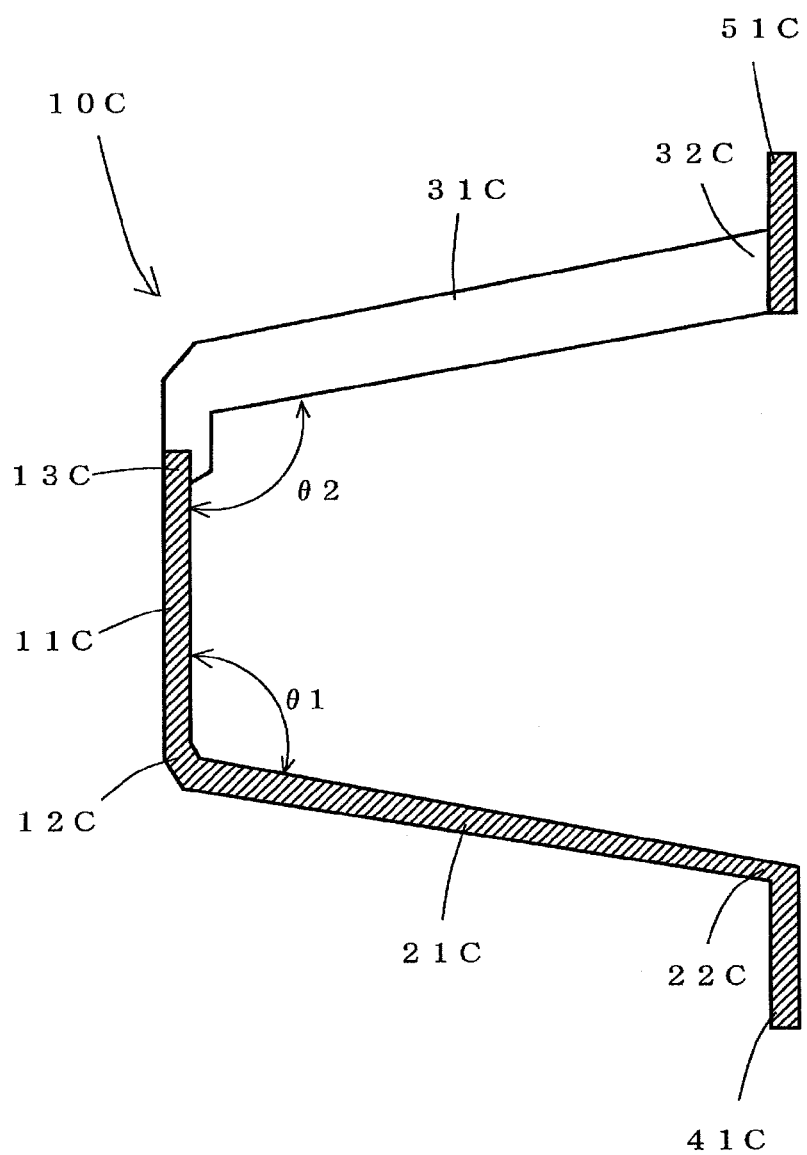
FIG. 8 is a cross-sectional view taken on line 5-5 illustrated in FIG. 4.
Figure 9:
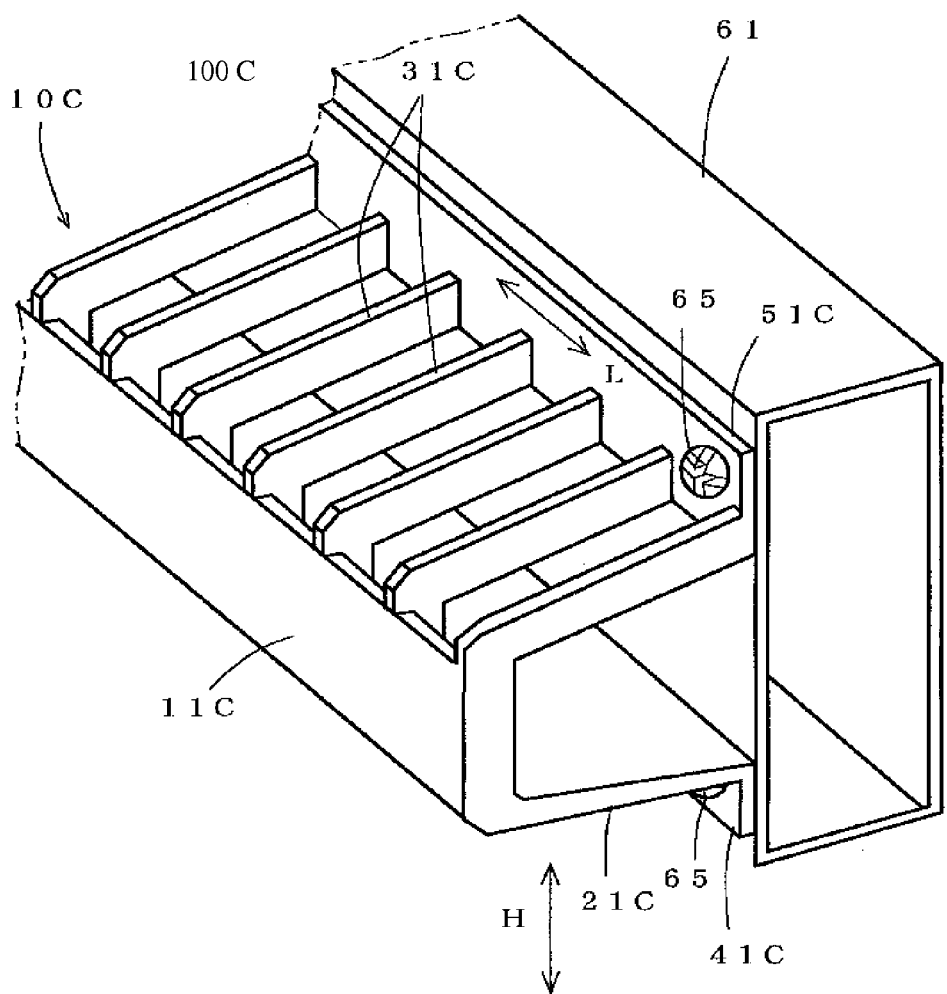
FIG. 9 is a perspective view illustrating an attached state of the shock absorbing member according to the third embodiment.

Hereinafter, exemplary embodiments of the invention are described in detail. FIG. 1 is a perspective view illustrating a shock absorbing member according to a first embodiment of the invention. FIG. 2 is a cross-sectional view taken on line 2-2 illustrated in FIG. 1. FIG. 3 is a perspective view illustrating an attached state of the shock absorbing member according to the first embodiment. FIG. 4 is a perspective view illustrating a shock absorbing member according to a second embodiment of the invention. FIG. 5 is a cross-sectional view taken on line 5-5 illustrated in FIG. 4. FIG. 6 is a perspective view illustrating an attached state of the shock absorbing member according to the second embodiment. FIG. 7 is a perspective view illustrating a shock absorbing member according to a third embodiment of the invention. FIG. 8 is a cross-sectional view taken on line 8-8 illustrated in FIG. 7. FIG. 9 is a perspective view illustrating an attached state of the shock absorbing member according to the third embodiment.

Figure 11:
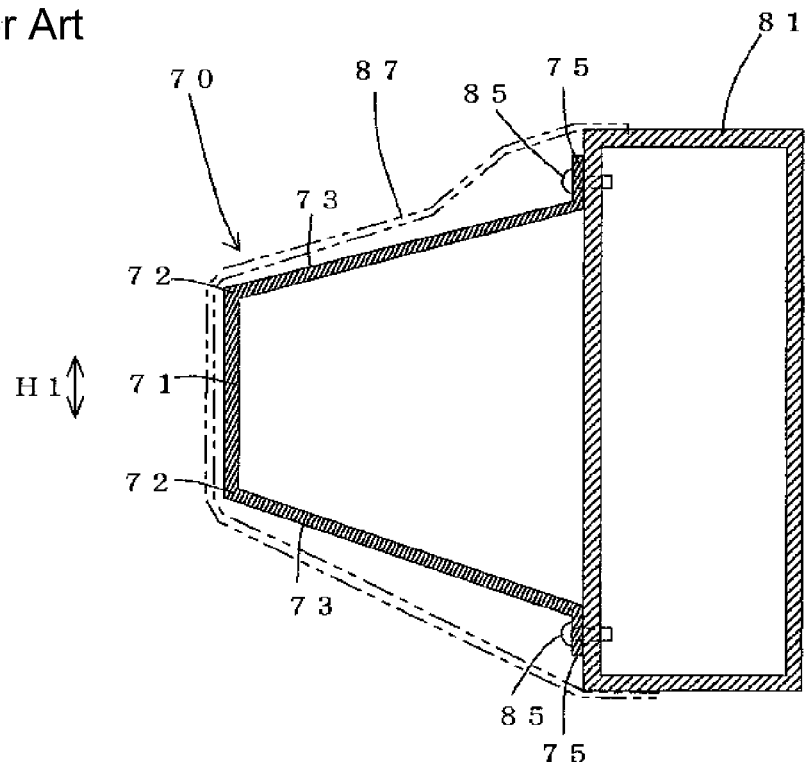
FIG. 11 is a cross-sectional view illustrating an attached state of a related-art shock absorbing member.
Figure 12:
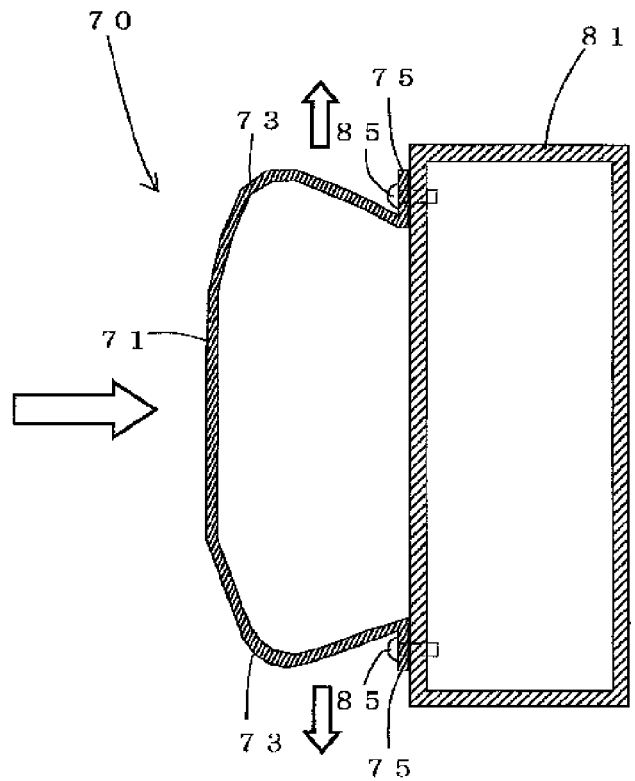
FIG. 12 is a cross-sectional view illustrating the deformation of the related-art shock absorbing member at the application of impact thereto.

A shock absorbing member 10A according to the first embodiment of the invention illustrated in FIGS. 1 to 3 is a shock absorbing member for an automotive bumper. The shock absorbing member 10A is attached to the front surface of a bumper reinforcement (referred to also as a bumper beam) 61 provided in a front or rear portion of an automobile. An exterior of the shock absorbing member 10A is covered by a bumper facer 87 illustrated in FIG. 11.

The shock absorbing member 10A is made of a synthetic resin, such as polypropylene (PP) and polyethylene (PE), and includes a pressure receiving wall portion 11A, a side wall portion 21A, vertical ribs 31A, and flange portions 41A, and 51A. The shock absorbing member 10A is formed into a laterally elongated shape, which has a cross-sectionally substantially-U-shaped side surface. An example of the shock absorbing member 10A is an injection-molded polypropylene article that is 1000 mm in length, 100 mm in up-down height, and 60 mm in anteroposterior depth.

The pressure receiving wall portion 11A corresponds to a front surface wall of the shock absorbing member 10A and is a surface that receives impact. The pressure receiving wall portion 11A according to the present embodiment is formed of a laterally elongated substantially rectangular shaped member. An example of the pressure receiving wall portion 11A is a member shaped so that is 1000 mm in length, 70 mm in up-down height, and 5 mm in thickness.

The side wall portion 21A is formed on one end portion side 12A in a direction H intersecting with a longitudinal direction L to extend along the longitudinal direction L towards the rear of the pressure receiving wall portion 11A. The side wall portion 21A is formed of a plate-like member. In the present embodiment, the side wall portion 21A is formed by being bent from one of upper and lower end portion sides of the pressure receiving portions 12A towards the rear side of the pressure receiving wall portion 11A. An example of the side wall portion 21A is formed so that the thickness is 3.5 mm, and that the angle θ1 formed between the side wall portion 21A and the pressure receiving wall portion 11A is 110°. Incidentally, the side wall portion 21A is not limited to that formed to be bent from one of the upper and lower end portion sides 12A towards the rear of the pressure receiving wall portion 11A, as illustrated in the FIGS. 1 to 3. The side wall portion 21A may be erected on the rear surface of the pressure receiving wall portion 11A.

A plurality of the vertical ribs 31A are formed on the end portion side 13A of the pressure receiving wall portion 11A, which is opposite to the one end portion side 12A on which the side wall portion 21A is formed, thereby extending in a direction intersecting with the longitudinal direction L, being provided towards the rear of the pressure receiving wall portion 11A, and being arranged like rows thereon in the longitudinal direction L. Each of the vertical ribs 31A is formed of a thin plate-like member, the thickness in the longitudinal direction L of which is less than that in the direction H intersecting with the longitudinal direction L. An interval between adjacent ones of the vertical ribs 31A is appropriately determined according to the dimensions of the vertical ribs 31A. An example of the vertical rib 31A is such that the thickness in the longitudinal direction L thereof is 3 mm, that the width (up-down width) in the direction H intersecting with the longitudinal direction L is 10 mm, that the each interval between the adjacent vertical ribs 31A is 20 mm, and that the angle θ2 between the vertical rib 31A and the pressure receiving wall portion 11A is 110°. Incidentally, the vertical rib 31A is not limited to that formed integrally with an end portion 13A of the pressure receiving wall portion 11A, which is opposite to the one end portion 12A, on which the side wall portion 21A is formed, as illustrated in FIGS. 1 to 3. The vertical rib 31A may be formed separately from the end portion 13A of the pressure receiving wall portion 11A, which is opposite to the one end portion 12A, on which the side wall portion 21A is formed, to be connected to the pressure receiving wall portion 11A. As shown in FIG. 3, openings 100A are provided between the vertical ribs 31A.

The flange portion 41A is formed on the end portion side 22A of the side wall portion 21A, which is opposite to the pressure receiving wall portion 11A. In the present embodiment, the flange portion 41A is formed by being outwardly (downwardly) bent substantially like a letter "L" from one end portion 22A of the side wall portion 21A, which is opposite to the pressure receiving wall portion 11A. Thus, the flange portion 41A constitutes an attaching portion. The flange portion 41A serving as the attaching portion is formed to extend substantially in parallel to the pressure receiving wall portion 11A. An example of the flange portion 41A is such that the width thereof (width in the up-down direction H intersecting with the longitudinal direction L) is 15 mm, and that the thickness thereof is 3 mm.

The flange portion 51A is formed on the end portion side 32A of an associated one of the vertical ribs 31A, which is opposite to the pressure receiving wall portion 11A. In the present embodiment, the flange portion 51A is formed thereon to connect the end portions 32A of the plurality of vertical ribs 31A, which are opposite to the pressure receiving portion 11A, and to extend substantially in parallel to the pressure receiving wall portion 11A. Thus, the flange portion 51A constitutes an attaching portion. An example of the flange portion 51A serving as the attaching portion is such that the width thereof in the direction (i.e., a direction intersecting with the direction L of the length) is 15 mm, and that the thickness thereof is 3 mm.

The shock absorbing member 10A is formed by first setting one of the side wall portion 21A and each vertical rib 31A at an upper side and setting the other of the side wall portion 21A and each vertical rib 31A at a lower side (in the present embodiment, each vertical rib 31A is set at the upper side, while the side wall portion 21A is set at the lower side). The shock absorbing member 10A is formed by fixing the flange portions 41A and 51A to the front surface of the bumper reinforcement 61 with attaching parts 65, such as bolts, as illustrated in FIG. 3.

The shock absorbing member 10A attached to the front surface of the bumper reinforcement 61 is such that when the pressure receiving wall portion 11A is pressed by shock or the like, one of the components provided at the upper side and the lower side of the pressure receiving wall portion 11A, i.e., the side wall portion 21A provided at the lower side thereof is bend-deformed in the direction H (up-down direction) intersecting with the longitudinal direction L. On the other hand, the component provided opposite to the side wall portion 21A, i.e., each vertical rib 31A placed at the upper side is bend-deformed in the longitudinal direction (lateral direction) L and absorbs the shock. At that time, stress acting in the direction of deformation of the side wall portion 21A, i.e., in the up-down direction intersecting with the longitudinal direction L is generated in the side wall portion 21A. On the other hand, lateral stress acting in the direction of deformation of each vertical rib 31A, i.e., along the longitudinal direction L is generated in each vertical rib 31A opposite to the side wall portion 21A. Because the stress generated in the side wall portion 21A differs from the stress generated in each vertical rib 31A in the direction in which the stress acts, the stress generated due to the shock is dispersed. Consequently, the stress applied to the flange portion 41A at the side of the side wall portion 21A and that applied to the flange portion 51A at the side of each vertical rib 31A can be reduced.

FIGS. 4 to 6 illustrate a shock absorbing member according to a second embodiment of the invention. The shock absorbing member 10B according to the second embodiment includes a pressure receiving wall portion 10B, a side wall portion 21B, vertical ribs 31B, and flange portions 41B and 51B. The configuration of the second embodiment is similar to that of the shock absorbing member 10A according to the first embodiment, excepting that a bending groove 33B is formed in each vertical rib 31B. In each of reference characters respectively representing components of the shock absorbing member 10B according to the second embodiment, a letter "B" written in addition to each numeral indicates that an associated component is of the second embodiment.

The bending groove 33B is intended to facilitate the bending-deformation of each vertical rib 31B in the longitudinal direction L of the pressure receiving wall portion 11B at the time of pressing the pressure receiving wall portion 11B. The bending groove 33B is formed in a surface 34B of each vertical rib 31B, which intersects with the longitudinal direction L. An example of the bending groove 33B is such that the width of the groove is 2 mm, and that the depth of the groove is 1 mm. The surface 34B intersecting with the longitudinal direction L is a surface placed in the longitudinal direction L of each vertical rib 31B. The bending groove 33B is formed to extend in an up-down direction (direction H intersecting with the longitudinal direction L) at the time of attaching the shock absorbing member 10B to the front surface of the bumper reinforcement 61. The number of the bending grooves 33B corresponding to each vertical rib 31B is not limited to one. Further, in the shock absorbing member 10B, the surface 34B of each vertical rib 31B in one half part of the vertical ribs 31B from the center position in the longitudinal direction L of the pressure receiving wall portion 11B can be made to be opposite to that 34B of each vertical rib 31B in the other half part of the vertical ribs 31B from the center position in the longitudinal direction L of the pressure receiving wall portion 11B. The surface 34B, in which the bending groove 33B is formed, can be set to be either one of or each of both of the side surfaces of the vertical ribs 31B.

Incidentally, the description of the other components of the shock absorbing member 10B according to the second embodiment is omitted, because the other components of the shock absorbing member 10B can be understood by reading, in the description of the first embodiment, "A" written in each reference numeral as "B". For example, the openings between the ribs 31B of the second embodiment are 100B and the openings between the ribs 31C are 100C.

The shock absorbing member 10B is formed by first setting one of the side wall portion 21B and each vertical rib 31B at an upper side and setting the other of the side wall portion 21B and each vertical rib 31B at a lower side (in the present embodiment, each vertical rib 31B is set at the upper side, while the side wall portion 21B is set at the lower side), and next fixing the flange portions 41B and 51B to the front surface of the bumper reinforcement 61 with attaching parts 65, such as bolts, as illustrated in FIG. 6.

The shock absorbing member 10B attached to the front surface of the bumper reinforcement 61 is such that when the pressure receiving wall portion 11B is pressed by shock or the like, one of the components provided at the upper side and the lower side of the pressure receiving wall portion 11B, i.e., the side wall portion 21B provided at the lower side thereof in the illustrated example is bend-deformed in the direction H (up-down direction) intersecting with the longitudinal direction L. On the other hand, the component provided opposite to the side wall portion 21B, i.e., each vertical rib 31B placed at the upper side in the illustrated example is bend-deformed in the longitudinal direction (lateral direction) L and absorbs the shock. Because the bending groove 33B is formed in each surface 34B intersecting with the longitudinal direction L of the pressure receiving wall portion 11B, each vertical rib 31B is surely bend-deformed in the longitudinal direction L at the application of impact thereto. Further, each vertical rib 31B can be prevented from being deformed in other directions. In addition, hindrance to deformation of each vertical rib 31B can be prevented.

At the application of impact to the shock absorbing member 10B, stress acting in the direction of deformation of the side wall portion 21B, i.e., in the up-down direction intersecting with the longitudinal direction L is generated in the side wall portion 21B. On the other hand, lateral stress acting in the direction of deformation of each vertical rib 31B, i.e., along the longitudinal direction L is generated in each vertical rib 31B opposite to the side wall portion 21B. Because the stress generated in the side wall portion 21B differs from the stress generated in each vertical rib 31B in the direction in which the stress acts, the stress generated due to the shock is dispersed. Consequently, the stress applied to the flange portion 41B at the side of the side wall portion 21B and that applied to the flange portion 51A at the side of each vertical rib 31B can be reduced.

FIGS. 7 to 9 illustrate a shock absorbing member according to a third embodiment of the invention. The shock absorbing member 10C according to the third embodiment includes a pressure receiving wall portion 11C, a side wall portion 21C, vertical ribs 31C, and flange portions 41C and 51C. The configuration of the third embodiment is similar to that of the shock absorbing member 10A according to the first embodiment, excepting that the thickness of the side wall portion 21C is reduced towards one end portion side thereof corresponding to the flange portion 41C from the other end portion side corresponding to the pressure receiving wall portion 11C. In each of reference characters respectively representing components of the shock absorbing member 10C according to the third embodiment, a letter "C" written in addition to each numeral indicates that an associated component is of the third embodiment.

Figure 10:
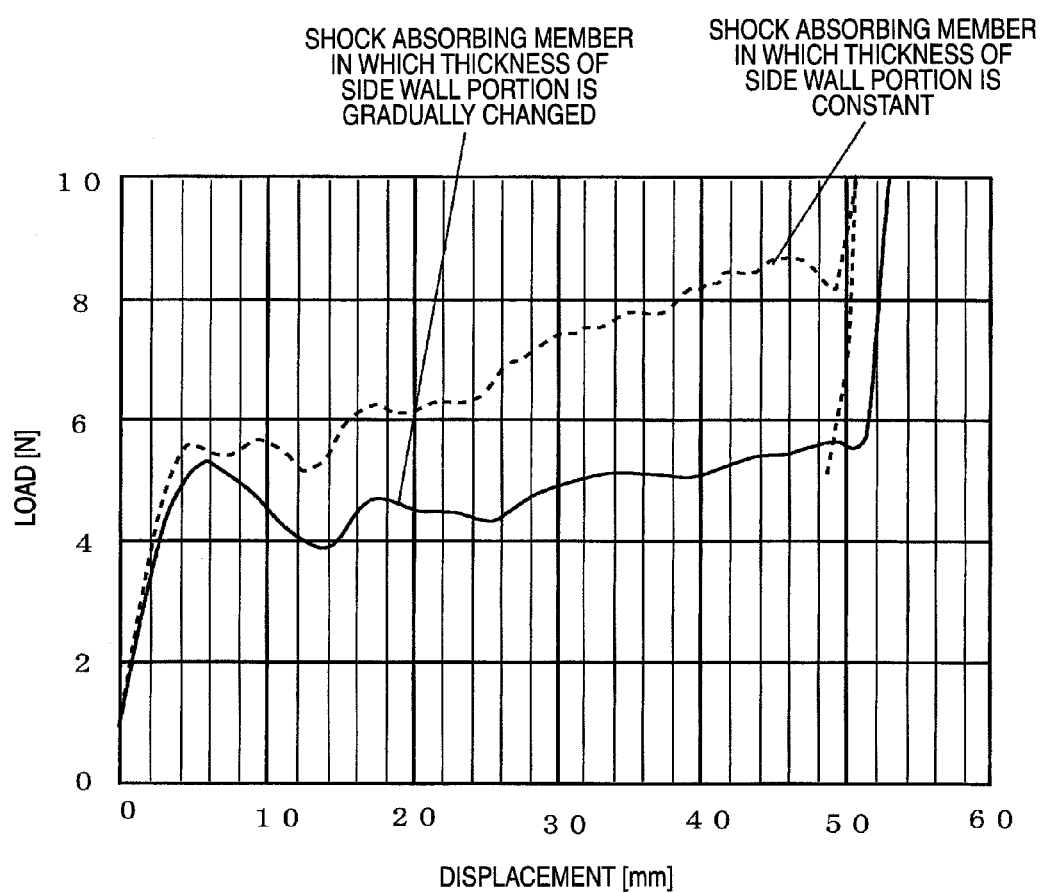
FIG. 10 is a graph illustrating a result of measurement of the relation between a load and an amount of displacement.

An example of the side wall portion 21C is such that the thickness thereof is changed so as to be gradually reduced from 4.5 mm at the side of the pressure receiving wall portion 11C to 2.5 mm at a side closer to the flange portion 41C, which is opposite to the pressure receiving wall portion 11C. Thus, the breakage of the flange portion 41C serving as the attaching portion can be prevented. In addition, the buckling distortion of the shock absorbing member 10C under a constant load can be facilitated. Consequently, a shock load can be reduced to a low level. FIG. 10 illustrates a result of measurement of the relation between a load and an amount of displacement, which is performed on the shock absorbing member 10C according to the third embodiment, in which the thickness of the side wall portion is set at a constant value of 3.5 mm, and in which the thickness of the side wall portion is gradually changed from 4.5 mm at the side of the pressure receiving wall portion to 2.5 mm at the side closer to the opposite flange portion. As is understood from FIG. 10, after the shock absorbing member 10C according to the third embodiment is started with an initial load, increase in the load relative to an amount of displacement is low in the shock absorbing member 10C, in which the thickness of the side wall portion is gradually reduced from one end portion side thereof corresponding to the pressure receiving wall portion towards the other end portion side thereof corresponding to the flange portion, as compared with the shock absorbing member in which the thickness of the side wall portion is constant.

Incidentally, the description of the other components of the shock absorbing member 10C according to the third embodiment is omitted, because the other components of the shock absorbing member 10C can be understood by reading, in the description of the first embodiment, "A" written in each reference numeral as "C".

The invention is not limited to the aforementioned embodiments and can be changed without departing from the gist thereof. For example, in each of the side wall portions 21A, 21B, and 21C, a bending groove extending along the longitudinal direction L of the pressure-receiving wall portion 11B can be formed to thereby facilitate the deformation of the side wall portion 21B in the direction intersecting with the longitudinal direction L at the moment of impact. Further, the side wall portion 21B according to the second embodiment can be modified such that the thickness of the side wall portion 21B is reduced towards one end portion thereof corresponding to the associated flange portion from the other end portion side thereof corresponding to the associated pressure receiving wall portion side, similarly to the side wall portion 21C according to the third embodiment. Additionally, although the shock absorbing member according to the invention is not limited to that for an automotive bumper, the shock absorbing member according to the invention can be used as that for use in another type apparatus.

Although the invention has been described in detail with reference to the specific embodiments, it is apparent to those skilled in the art that the invention can be changed or modified in various manners without departing from the spirit and scope of the invention. This application is based on Japanese Patent Application No. 2007-115086 filed Apr. 25, 2007, which is hereby incorporated by reference herein.

The invention claimed is:

1. A shock absorbing member comprising:
   a pressure receiving wall portion including a first end portion side and a second end portion side, the second end portion side being opposite to the first end portion side;
   a side wall portion extending from the first end portion side towards a rear of said pressure receiving wall portion in a direction perpendicular to a longitudinal direction of said pressure receiving wall portion and extending along the longitudinal direction, and the side wall portion including a first flange portion formed on one end portion side of said side wall portion, the one end portion side of said side wall portion being opposite to said pressure receiving wall portion;
   a plurality of vertical ribs extending from the second end portion side of said pressure receiving wall portion towards the rear of said pressure receiving wall portion to intersect with the longitudinal direction, the plurality of vertical ribs being arranged in rows that intersect the longitudinal direction, the plurality of vertical ribs including a second flange portion formed on one end portion side of each of said plurality of vertical ribs, the one end portion side of each of the plurality of ribs being opposite to said pressure receiving wall portion;

wherein openings are formed between said plurality of ribs such that each of the plurality of ribs is bend-deformed in the longitudinal direction when the pressure receiving wall portion is pressed rearward by a shock, the openings extending from the second end portion side of said pressure receiving wall portion to the one end portion side of each of the plurality of ribs.

2. The shock absorbing member according to claim 1, wherein said first flange portion is connected to end portion of said side wall portion, which are opposite to said pressure receiving wall portion, thereby said first flange portion is formed substantially in parallel to said pressure receiving portion.

3. The shock absorbing member according to claim 1, wherein said second flange portion is connected to end portions of said plurality of vertical ribs, which are opposite to said pressure receiving wall portion, thereby said second flange portion is formed substantially in parallel to said pressure receiving portion.

4. The shock absorbing member according to claim 1, wherein a groove is formed in a surface of each of said plurality of vertical ribs such that said surface intersects with the longitudinal direction.

5. The shock absorbing member according to claim 1, wherein a thickness of said side wall portion is reduced towards one end portion side thereof corresponding to said first flange portion from the other end portion side thereof corresponding to said pressure receiving wall portion.

6. The shock absorbing member according to claim 2, wherein said second flange portion is connected to end portions of said plurality of vertical ribs, which are opposite to said pressure receiving wall portion, and said second flange portion is formed substantially in parallel to said pressure receiving wall portion.

* * * * *